United States Patent
Sinop et al.

(10) Patent No.: US 8,335,955 B2
(45) Date of Patent: Dec. 18, 2012

(54) SYSTEM AND METHOD FOR SIGNAL RECONSTRUCTION FROM INCOMPLETE DATA

(75) Inventors: Ali Kemal Sinop, Pittsburgh, PA (US); Leo Grady, Yardley, PA (US)

(73) Assignee: Siemens Aktiengesellschaft, Munich (DE)

( * ) Notice: Subject to any disclaimer, the term of this patent is extended or adjusted under 35 U.S.C. 154(b) by 769 days.

(21) Appl. No.: 12/487,689

(22) Filed: Jun. 19, 2009

(65) Prior Publication Data
US 2010/0011268 A1    Jan. 14, 2010

Related U.S. Application Data

(60) Provisional application No. 61/075,151, filed on Jun. 24, 2008.

(51) Int. Cl.
*H03M 13/00* (2006.01)

(52) U.S. Cl. .......................... 714/746; 714/796; 714/735

(58) Field of Classification Search ................ 714/746, 714/735, 796, 728, 782, 781, 784, 785, 786, 714/6.13
See application file for complete search history.

(56) References Cited

U.S. PATENT DOCUMENTS
6,768,782 B1 * 7/2004 Hsieh et al. ................ 378/8
2009/0222226 A1 * 9/2009 Baraniuk et al. ............ 702/66

* cited by examiner

*Primary Examiner* — Fritz Alphonse
(74) *Attorney, Agent, or Firm* — Donald B. Paschburg

(57) ABSTRACT

A method for reconstructing a signal from incomplete data in a signal processing device includes acquiring incomplete signal data. An initial reconstruction of the incomplete signal data is generated. A reconstruction is generated starting from the initial reconstruction by repeating the steps of: calculating a sparsity transform of the reconstruction, measuring an approximation of sparsity of the reconstruction by applying an m-estimator to the calculated sparsity transform, and iteratively optimizing the reconstruction to minimize output of the m-estimator thereby maximizing the approximation of sparsity for the reconstruction. The optimized reconstruction is provided as a representation of the incomplete data.

22 Claims, 8 Drawing Sheets

Approach 1: Approach to Approximating (6)

Input: Initial solution $x(0)$, edge list $E$, matrix $B$ and vector $b, \alpha$

Output: Final solution $x(t)$

Let $A$ be the node-edge incidence matrix for edge list $E$;

$t \leftarrow 0$;

repeat
   foreach $e_{ij} \in E$ do
      $c_{ij} \leftarrow \alpha e^{\wedge}(\alpha(x_i(t)-x_j(t))^2)$;
   end
   $C \leftarrow \text{diag}(c)$;
   $L \leftarrow A^T C A$;
   Solve $\begin{bmatrix} L & B^T \\ B & 0 \end{bmatrix} \begin{bmatrix} x \\ y \end{bmatrix} = \begin{bmatrix} 0 \\ b \end{bmatrix}$;
   $t \leftarrow t + 1$;
until $\|x(t)-x(t-1)\|_\infty < \varepsilon$ ;

FIG. 2

Approach 2: Approach to Approximating (16)

Input: Initial solution $x(0)$, edge list $E$, matrix $B$ and vector $b, \alpha, \beta, \lambda$

Output: Final solution $x(t)$

Let $A$ be the node-edge incidence matrix for edge list $E$;

$t \leftarrow 0$;

repeat foreach $e_{ij} \in E$ do

$c_{ij} \leftarrow \alpha e \wedge (\alpha (x_i(t) - x_j(t))^2)$;

end foreach $j$ do

$err_j \leftarrow \beta e \wedge (-\beta ((Bx(t))_i - b_i)^2)$;

end

$C_e \leftarrow \text{diag}(c)$;

$C_b \leftarrow \text{diag}(err)$;

$L \leftarrow A^T C A$;

$x(t+1) \leftarrow (L + \lambda B^T C_b B)^{-1}(\lambda B^T C_b b)$;

$t \leftarrow t + 1$;

until $\|x(t) - x(t-1)\|_\infty < \varepsilon$;

FIG. 3

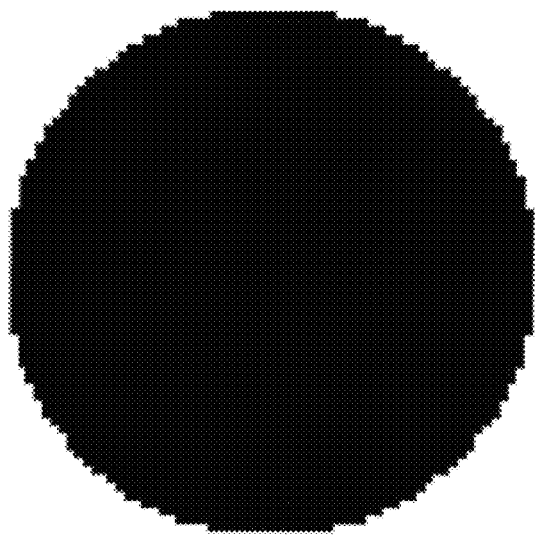 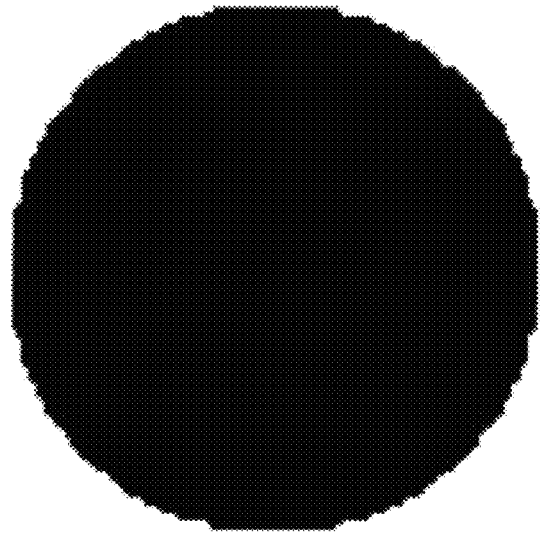
(a)        (b)
FIG. 4

SYSTEM AND METHOD FOR SIGNAL RECONSTRUCTION FROM INCOMPLETE DATA

CROSS-REFERENCE TO RELATED APPLICATION

The present application is based on provisional application Ser. No. 61/075,151, filed Jun. 24, 2008, the entire contents of which are herein incorporated by reference.

BACKGROUND OF THE INVENTION

1. Technical Field

The present disclosure relates to signal reconstruction and, more specifically, to a system and method for signal reconstruction from incomplete data.

2. Discussion of Related Art

Electronic signals are commonly represented by digital data. These electronic signals may represent audio data, image data and a wide range of other forms of data. Often, the digital data that represents the electronic signal only contains partial information. This occurs, to some extent, when the process of digitization samples only at regular predetermined intervals, rather than continuously. The resulting digital signal therefore may not include all of the information necessary to fully reproduce the original electronic signal. This lack of complete information may be exacerbated when the digital data is subjected to lossy digital compression techniques that tend to substantially reduce file size by excluding certain data that is calculated to have a reduced impact on signal quality. Incomplete reception of transmitted digital data may also result in the obtaining of partial information.

Reconstruction is the process of reproducing electronic signals from digital data. Reconstruction may therefore be used to reproduce sound from a sound file, to reproduce an image from an image file, or to reproduce another form of signal from digital data. For example, in the field of medical imaging, reconstruction may be used to generate tomography data from detected x-rays, in the case of computed tomography (CT), or from detected magnetic fields, in the case of magnetic resonance imaging (MRI). In such cases, the collected digital data may also be incomplete. Incomplete data collection may, for example, be the result of an intentional collection of only partial data for the purposes of speeding up the process of image data acquisition. Partial data may also be collected in order to lower a radiation dose that a patient is exposed to during CT acquisition.

Thus, it is often necessary to perform reconstruction on incomplete data. For example, sound waves may be reconstructed from incomplete digital sound data and magnetic tomography images may be reconstructed from incomplete digital magnetic field data. In reconstruction, missing data may be approximated as best as possible based on the characteristics of the available data.

There are many approaches for approximating missing data based on available data. One such approach starts with the assumption that signals, such as those representing sound and images, tend to have smooth characteristics that can be expressed in terms of zero-value gradients or zero-value results from another form of transform. Such transforms may be calculated, for example, by a gradient transform, a wavelet transform or another suitable approach. Thus, the missing data may be approximated as that data which provides for the complete signal, a maximum number of zero-value gradients, or more precisely, a minimum number of non-zero value gradients. Such approaches to reconstruction of signals from incomplete data are known as "sparse reconstruction" as they seek to maximize "sparsity" which is defined conventionally as the characteristic of having zero-values.

However, in practice, minimizing non-zero gradients in reconstructed data can be quite difficult and may not be effectively computable within an acceptable amount of time.

SUMMARY

A method for reconstructing a signal from incomplete data in a signal processing device includes acquiring incomplete signal data. An initial reconstruction of the incomplete signal data is generated. A reconstruction is generated starting from the initial reconstruction by repeating the steps of: calculating a sparsity transform of the reconstruction, measuring an approximation of sparsity of the reconstruction by applying an m-estimator to the calculated sparsity transform, and iteratively optimizing the reconstruction to minimize output of the m-estimator and thereby maximizing the approximation of sparsity the approximation of sparsity for the reconstruction. The optimized reconstruction is provided as a representation of the incomplete data.

The sparsity transform may be a gradient transform and/or a wavelet transform. The incomplete signal data may be acoustic data, image data, and/or MR data.

The m-estimator may be one or more of a Welsch function, a Cauchy function, a Tukey function, a Huber function, a Fair function, or a Geman function.

The approximation of sparsity may be measured using a robust error function $\sigma_\alpha(x)$ that is defined as:

$$\sigma_\alpha(x) = \sum_i \left(1 - e^{-\alpha x_i^2}\right)$$

wherein $\alpha$ determines the degree to which sparsity is approximated.

Minimizing the output of the m-estimator may be performed by optimizing:

$$\min_x \sigma_\alpha(Ax),$$
$$\text{s.t. } Bx = b$$

wherein A is the sparsity transform, B is a matrix representing the acquisition basis of the acquired incomplete signal data, b is a vector of measurement for the acquired incomplete signal data, and x is the reconstruction.

Minimizing the output of the m-estimator may include minimizing the occurrence of outputs of the sparsity transforms that are not very small. What is defined to be very small may be determined by $\alpha$, which is the degree to which sparsity is approximated.

Minimizing the output of the m-estimator may include minimizing a robust error function $\sigma_\alpha a(x)$ that is defined by the m-estimator. Minimizing the output of the m-estimator may be performed using a series of quadratic minimization problems.

The incomplete signal data may be assumed to be either noiseless or to include noise and when it is assumed that the incomplete signal data includes noise, noise may be penalized during the generation of the initial reconstruction. Noise may be penalized during the generation of the initial reconstruction includes relaxing a strict equality constraint and penalizing deviations from measurements with an $l_2$ measure. Alternatively, noise may be penalized during the generation of the initial reconstruction by penalizing deviations from measurements with an $l_0$ measure that measures error as a number of acquired measurements that are not satisfied by the initial reconstruction.

The initial reconstruction may be generated by assuming data missing from the incomplete data has a particular value, for example, zero. Alternatively, the initial reconstruction may be generated by using a known approach for finding an optimized reconstruction or by using, as the initial reconstruction, an optimized reconstruction of a prior performance of the steps of calculating the sparsity transform, measuring an approximation of sparsity of the reconstruction, and iteratively optimizing the reconstruction.

Providing the optimized reconstruction as a representation of the incomplete data may include displaying the reconstruction to a user.

A signal processing system for reconstructing a signal from incomplete data includes an initial reconstruction unit for generating an initial reconstruction of incomplete signal data and an optimizing unit for generating a reconstruction starting with the initial reconstruction by iteratively optimizing the reconstruction to maximize an approximation of sparsity for the reconstruction. The approximation of sparsity for the reconstruction includes the use of an m-estimator.

The approximation of sparsity for the reconstruction may include the use of an m-estimator applied to a calculation of a sparsity transform of the reconstruction.

A computer system includes a processor and a program storage device readable by the computer system, embodying a program of instructions executable by the processor to perform method steps for reconstructing a signal from incomplete data. The method includes generating an initial reconstruction of an incomplete signal data and generating a reconstruction starting from the initial reconstruction by repeating the steps of calculating a sparsity transform of the reconstruction, measuring an approximation of sparsity of the reconstruction by applying an m-estimator to the calculated sparsity transform, and iteratively optimizing the reconstruction to maximize the approximation of sparsity for the reconstruction.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein:

FIG. 2 illustrates pseudo-code representing an iterative approach for reconstructing an incomplete noiseless signal according to an exemplary embodiment of the present invention;

FIG. 3 illustrates pseudo-code representing an iterative approach for reconstructing an incomplete signal having noise according to an exemplary embodiment of the present invention;

FIG. 4(a) illustrates a course image as produced by original incomplete image data;

FIG. 4(b) illustrates a fine superresolution image in which reconstruction has been performed in accordance with exemplary embodiments of the present invention;

DETAILED DESCRIPTION OF THE DRAWINGS

Figure 1:
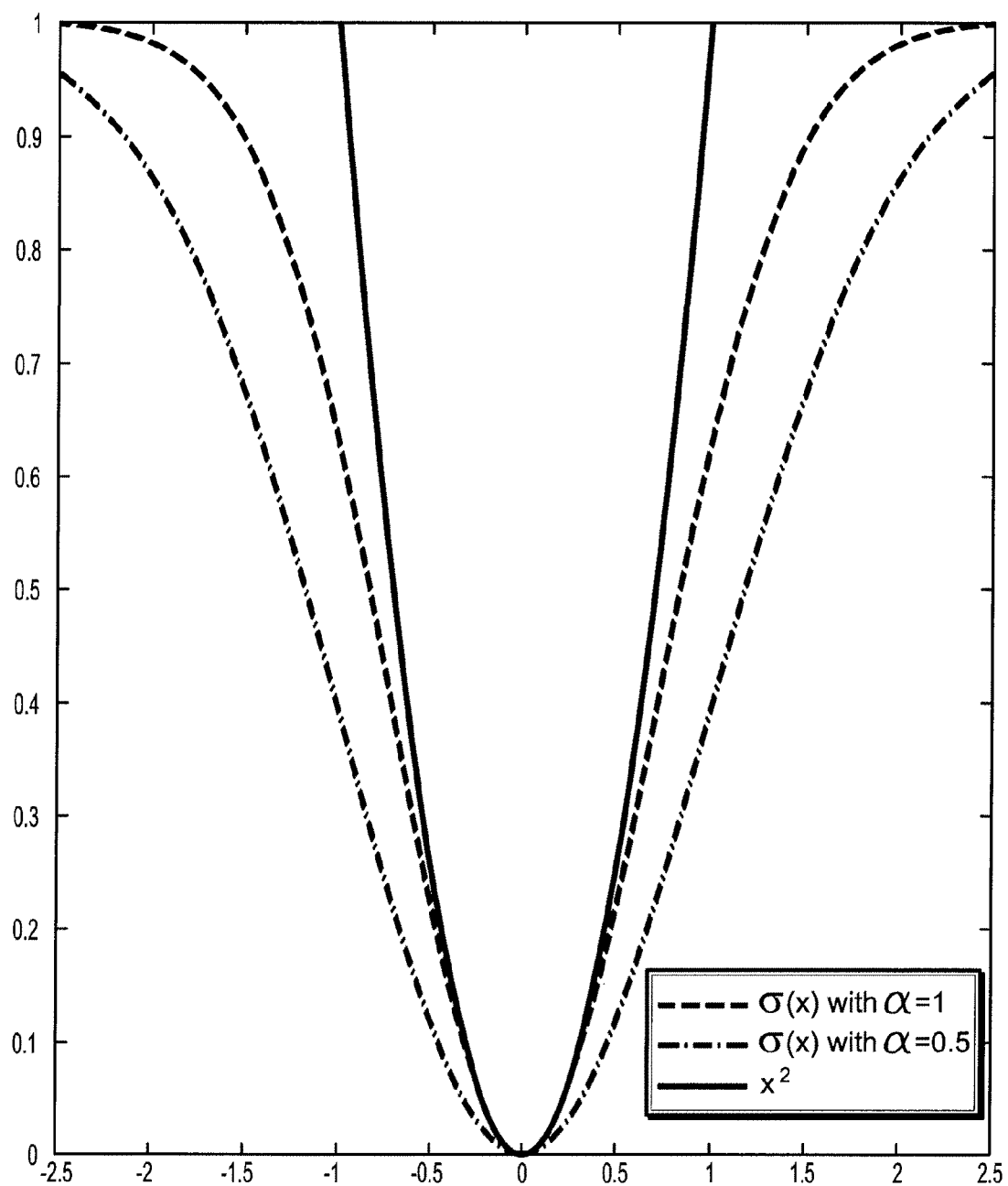
FIG. 1 is a plot illustrating a function for approximating the $l_0$ norm for different values of $\alpha$ shown alongside the square function $x^2$ in accordance with exemplary embodiments of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention seek to provide a system and method for reconstructing signals based on incomplete data quickly and accurately so that signal reconstruction may be performed effectively within an acceptable amount of time. Rather than trying to minimize a number of non-zero values for transform results, exemplary embodiments of the present invention seek to minimize the occurrence of gradients that are not "very small," wherein the values that constitute "very small" are determined based on a non-zero parameter value that may be optimized during an iterative process.

This process may be performed by using an m-estimator, for example, a differentiable m-estimator, to measure an approximation of sparsity. The m-estimator may be used to approximate sparsity by measuring the occurrence of non-very small value gradients rather than measuring the occurrence of actual sparsity. The m-estimator that represents the approximation of sparsity may then be minimized to find the reconstruction that represents a minimum number of non-very small value gradients. This minimization may thus provide for a reconstruction. The end result may thus be a high-quality reconstruction that is of a higher resolution and/or image quality than would ordinarily be possible from the incomplete data set.

The m-estimator may be used as a robust error function $\sigma_\alpha(x)$, where $\alpha$ indicates the quality of the approximation. As $\alpha$ increases, the robust error function approaches sparsity, which may be represented as $\|x\|_0$. Thus as $\alpha \to \infty$ then $\sigma_\alpha(x) \to \|x\|_0$, where x, in this case, represents sparsity transform results for the reconstruction data.

Exemplary embodiments of the present invention may utilize one or more of a number of m-estimator functions such as the Welsch function, the Cauchy function, the Tukey function, the Huber function, the Fair function, the Geman function, etc. Examples of these functions are provided below:

$$\text{Welsch } \frac{\alpha^2}{2}\left(1 - \exp\left(-\left(\frac{x}{\alpha}\right)^2\right)\right)$$

$$\text{Cauchy } \frac{\alpha^2}{2}\log\left(1 + \left(\frac{x}{\alpha}\right)^2\right)$$

-continued $$\text{Tukey} \begin{cases} \frac{\alpha^2}{6}\left(1 - \left(1 - \left(\frac{x}{\alpha}\right)^2\right)^3\right), & \text{if } |x| \le \alpha \\ \frac{\alpha^2}{6}, & \text{if } |x| > \alpha \end{cases}$$

$$\text{Huber} \begin{cases} \frac{x^2}{2}, & \text{if } |x| \le \alpha \\ \alpha\left(|x| - \frac{\alpha}{2}\right), & \text{if } |x| > \alpha \end{cases}$$

$$\text{Fair } \alpha^2\left(\frac{|x|}{\alpha} - \log\left(1 + \frac{|x|}{\alpha}\right)\right)$$

$$\text{Geman } \frac{\frac{x^2}{2}}{1 + x^2}$$

While only a limited number of m-estimator functions have been provided above, it should be understood that exemplary embodiments of the present invention may utilize any m-estimator functions for the measurement of sparsity. Exemplary embodiments of the present invention are discussed below with reference to the use of the Welsch function for the purposes of providing a concise disclosure, and it should be understood that other differentiable m-estimator functions, such as those listed above, may be used for the measurement of sparsity.

In general, reconstruction may be defined as:

$$\min_x \|x\|_p, \qquad (1)$$
$$\text{s.t. } Bx = b.$$

wherein B is an m×n matrix representing a reconstruction basis: b is an arbitrary m×1 vector that is known a priori, for example, via acquisition; x is an n×1 reconstructed signal and $\|\cdot\|_p$ represents the p-norm of the argument vector. The particular case in which p is zero may be referred to as the "sparse reconstruction problem."

When n>m, the solution to Bx=b is not unique and the minimization of $\|x\|_p$ is imposed as a regularizer to find an optimal solution. The term "sparse reconstruction" refers to an attempt to find a solution to Bx=b for which x has as many zeros as possible. Accordingly, the solution to Bx=b may be provided using the smallest number of basis functions in B as possible (a sparse representation). This definition of sparsity corresponds mathematically to the choice of p=0 for the norm in Equation (1) which, according to conventional approaches, may be very difficult to minimize in terms of computational and time resources.

Exemplary embodiments of the present invention may employ an approximation of an $l_0$ norm as a truncated $l_2$ norm, which may be used to provide a unique solution and an efficient optimization. Specifically, the $l_0$ norm may be approximated with the following function:

$$\sigma_\alpha(x) = \sum_i \left(1 - e^{-\alpha x_i^2}\right) \qquad (2)$$

FIG. 1 is a plot of the function expressed in Equation (2) for different values of $\alpha$ shown alongside the square function $x^2$. In this plot, the robust error function $\sigma_\alpha(x)$ is plotted for different values of $\alpha$. As can be seen from this plot, as $\alpha \to \infty$ then $\sigma_\alpha(x) \to \|x\|_0$.

As discussed above, the reconstruction of signals, for example image signals, having an incomplete acquisition is a common application of sparse reconstruction techniques. Although the signal to reconstruct may represent an image, a "sparse" image (i.e. an image with mostly black pixels) is generally not the desired goal. Instead, the goal of sparse reconstruction is to model the reconstructed image to as uniform as possible, with nonzero gradients occurring between as few pixels as possible. Accordingly, the goal may be expressed as an optimization of the following equation:

$$\min_x \|x\|_0, \qquad (3)$$
$$\text{s.t. } Bx = b.$$

This problem may be generalized using the principals of graph theory where the reconstruction of image data obtained on a graph (of which the standard lattice is a special case). For example, a graph, as defined by graph theory, consists of a pair G=(V,E) with vertices (nodes) $v \in V$ and edges $e \in E \subset V \times V$, with N=|V| and M=|E|. An edge, e, spanning two vertices, $v_i$ and $v_j$, is denoted by $e_{ij}$. A weighted graph assigns a value to each edge called a weight. The weight of an edge, $e_{ij}$, is denoted by $w(e_{ij})$ or $w_{ij}$ and is assumed here to be nonnegative. It may then be assumed that the graph is connected and undirected (i.e., $w_{ij}=w_{ji}$). An image may be associated with a graph by identifying each pixel with a node and defining an edge set to represent the local neighborhood relationship of the pixels (e.g., a 4-connected lattice). Although exemplary embodiments of the present invention may be described herein in terms of 2D images, it may be understood that the graph formulation extends to 3D lattices (images) and arbitrary graph structures (e.g., mesh reconstruction).

The analogous gradient operator on a graph may be given by the node-edge incidence matrix:

$$A_{e_{ij}v_k} = \begin{cases} +1 & \text{if } i = k, \\ -1 & \text{if } j = k, \\ 0 & \text{otherwise}, \end{cases} \qquad (4)$$

for every vertex $v_k$ and edge $e_{ij}$, where each $e_{ij}$ has been arbitrarily assigned an orientation. Consequently, the gradient of x may be expressed as the product Ax. It should be understood that the combinatorial gradient represented by Equation (4) may be built with increasing levels of connectivity in order to better approximate the gradient (e.g., a 4-connected or 8-connected lattice). Additionally, gradient weighting, for example, as discussed in Y. Boykov and V. Kolmogorov, *Computing Geodesics and Minimal Surfaces via Graph Cuts*, Proceedings of International Conference on Computer Vision, volume 1, pages 26-33, October 2003, which is incorporated herein by reference, may be used to multiply each row of A with the weight corresponding to each edge.

Therefore, if x represents the vectorized image data assigned to each node, the image reconstruction problem of Equation (3) may be rewritten as:

$$\min_x \|Ax\|_0, \qquad (5)$$
$$\text{s.t. } Bx = b.$$

with the approximation to the $l_0$ norm obtained via the "robust" $l_2$ norm, the solution may be found by optimizing:

$$\min_x \sigma_\alpha(Ax), \quad (6)$$

$$s.t. \quad Bx = b.$$

Examples for approaches to optimize Equation (6) are provided in detail below, given a basis set B and measurements b.

In order to solve for the optimization of Equation (6), the solution to a simpler problem may first be considered:

$$\min_x \|cAx\|_2^2 = x^T A^T CAx = \sum_{e_{ij} \in E} c_{ij}(x_i - x_j)^2, \quad (7)$$

$$s.t. \quad Bx = b.$$

where C is a diagonal matrix with all non-negative entries $c_{ij} \geq 0$. The matrix $A^T CA = L$ is also known as Laplacian matrix. The solution to the following linear system also gives a solution to:

$$\begin{bmatrix} L & B^T \\ B & 0 \end{bmatrix} \begin{bmatrix} x \\ y \end{bmatrix} = \begin{bmatrix} 0 \\ b \end{bmatrix} \quad (8)$$

An iterative approach may be used to approximate the solution to Equation (6), for example, based on a series of quadratic minimization problems. FIG. 2 illustrates pseudo-code representing an iterative approach for solving Equation (6) according to an exemplary embodiment of the present invention. First, a current estimate $s_0$ of $\sigma(s)$ may be considered. This consideration may provide the following equation:

$$e^{-\alpha s^2} \leq \alpha e^{-\alpha s_0^2} S^2 + 1 - (1 + \alpha s_0^2) e^{-\alpha s_0^2}, \quad (9)$$

wherein a solution as close as possible to $e^{-\alpha s^2}$ may then be found, i.e., the quadratic optimization problem:

$$\min_s s^2 \alpha e^{-\alpha s_0^2}, \quad (10)$$

with coefficients $c_{ij} = \alpha e^{(-\alpha s_0^2)}$, $\forall e_{ij} \in E$. In the case of image reconstruction s=Ax, the solution of Equation (7) with C given above may be found. The solution to this problem may be given by the linear system of Equation (8). Hence solving of this linear system will produce a new solution that strictly decreases the objective function $\sigma_\alpha(x)$. Consequently, an iterative algorithm may be used to solve the optimization problem described in (6).

An efficient algorithm may be used for reconstruction bases having a known (or easy to compute) basis for the nullspace, R, (i.e., BR=0). The variable x may be decomposed into two parts $x=x_0+\bar{x}$, such that $Bx_0=b$ and $Rz=\bar{x}$. Given any solution $x_0$ satisfying the constraints, the variables may be switched to z by replacing Equation (7) with the unconstrained optimization:

$$\min_{\bar{x}} \bar{x}^T L \bar{x} + 2\bar{x}^T Lx_0, \quad (11)$$

or, after a change of variable to optimize over z:

$$\min_z z^T R^T LRz + 2z^T R^T Lx_0, \quad (12)$$

which takes a minimum at the solution of:

$$R^T LRz = -R^T Lx_0, \quad (13)$$

Therefore, when the nullspace, R of B is known or easy to compute, the solution of Equation (8), as calculated, for example, using pseudo-code of Approach 1, depicted in FIG. 2, may be replaced by the solution to Equation (13). In general, if the number of pixels (nodes) is N and the number of constraints is K, such that K<N, then the number of unknowns in Equation (8) is N+K while the number of unknowns in Equation (13) is N−K.

Although the linear system of equations described in Equation (8) (or Equation (13) for that matter) could be solved via direct methods such as Gaussian elimination, the form of B used in a particular application (or its nullspace) may result in dense linear systems. Consequently the use of iterative methods (e.g., conjugate gradients) may permit application in parts without requiring an explicit representation of the matrix. However, since Equation (8) is not a positive definite matrix, gradient descent methods (like conjugate gradients) may not find the optimal solution. Therefore, Equation (13) may be solved or Equation (8) may be solved using a direct method.

The sparse image reconstruction problem has been described above using the obtained measurements as constraints, for example as shown in Equation (5). This approach to image reconstruction may implicitly assume that the measurement vector, b, has zero noise. In the acquisition of real signals, the measurements may not have zero noise. The noise may be assumed to be i.i.d. with a zero-mean, and the strict equality constraint may be relaxed and deviations from the measurements may be penalized with an $l_2$ measure, for example:

$$\min_x \sigma_\alpha(Ax) + \lambda \|Bx - b\|_2, \quad (14)$$

The noise model may instead be designed to expect "shot" noise (i.e., very few deviations from Bx=b, with each deviation being relatively large), and for such an expectation, a sparseness penalty may be used for the noise:

$$\min_x \sigma_\alpha(Ax) + \lambda \|Bx - b\|_0, \quad (15)$$

for some free parameter $\lambda$.

The robust $l_2$ norm function $\sigma_\alpha(\cdot)$ discussed above may constitute a noise penalty function utilizing an $l_2$ norm without overly penalizing the outliers caused by shot noise. Consequently, in the presence of noisy measurements, the image reconstruction may be formed by optimizing:

$$\min_x \sigma_\alpha(Ax) + \lambda \sigma_\beta(Bx - b), \quad (16)$$

It should be noted however, that the use of $\sigma_\alpha(\cdot)$ in the first term approximates the $l_0$ norm and the use of $\sigma_\alpha(\cdot)$ in the second term dampens noisy measurements. Consequently, the $\alpha$ parameter of the $\sigma_\alpha(\cdot)$ function in the first term may be set relatively high while the α parameter in the $\sigma_\alpha(\cdot)$ function of the second term may be set relatively low.

To solve the optimization problem with noisy measurements, exemplary embodiments of the present invention may use the idea of approximating $\sigma_\alpha$ with a series of quadratic functions. Hence at each iteration, the solution may be expressed as a quadratic optimization problem of the form:

$$\min_x x^T A^T C_e A x + \lambda (Bx - b)^T C_b (Bx - b) \quad (17)$$

The optimal solution to this problem may thus be expressed as:

$$(A^T C_e A + \lambda B^T C_b B)x = \lambda B^T C_b b$$

$$\text{Here } C_b = \begin{bmatrix} err_1 & 0 & 0 & \cdots & 0 \\ 0 & err_2 & 0 & \cdots & 0 \\ 0 & 0 & err_3 & \cdots & 0 \\ \vdots & \vdots & \vdots & \ddots & \vdots \\ 0 & 0 & 0 & \cdots & 0 \end{bmatrix}$$

where $err_i = \beta e\hat{}(-\beta((Bx)_i - b_i)^2$.

FIG. 3 illustrates pseudo-code representing an iterative approach for solving Equation (16) according to an exemplary embodiment of the present invention in which it is assumed that the signal to be reconstructed contains noise.

The sparse image reconstruction method embodied in Approach 2 of FIG. 3 may have many applications, such as MR reconstruction, pMRI reconstruction, CT reconstruction and even superresolution. For exemplary purposes, this approach is discussed as applied to super-resolution and MR reconstruction.

Super-resolution (SR) is defined herein as the problem of inputing an image obtained at a fixed resolution, K×K and outputting an image with higher resolution, 2K×2K. One approach to SR might be to employ bilinear interpolation.

In the context of the sparse image reconstruction problem presented in Equation (6), this sparse reconstruction problem may employ the simplest choices of basis function B and measurements b. Where the coarse image is indexed from $(x_c, y_c)=0-K$ and the fine image is indexed from $(x_f, y_f)=0-(2K)$, then a set of pixels $C=\{x_f, y_f | x_f/2 \text{ and } y_f/2 \text{ integer}\}$ may be produced for which the image data from the coarse image is associated. The set F may then be defined to consist of the remaining pixels, i.e., F=V−C where V is the set of all nodes (pixels). Permutation of the reconstructed image variable x to be $[x_C; x_F]$ (using "MATLAB notation"), may result in Equation (6) taking the form:

$$\min_x \sigma_\alpha([A_C A_F]x), \quad (18)$$
$$\text{s.t } [I \ 0]x = x_o.$$

where I indicates the identity matrix, 0 is the matrix of all zeros and $x_0$ represents the initial coarse-resolution data. Solving this problem using the optimization method of the noiseless case discussed in detail above yields results as displayed in FIG. 4. FIG. 4 illustrates an example of using sparse reconstruction techniques according to exemplary embodiments of the present invention wherein FIG. 4(a) illustrates a course image as produced by original incomplete image data and FIG. 4(b) illustrates a fine superresolution image in which reconstruction has been performed in accordance with exemplary embodiments of the present invention. FIG. 4(a) represents a synthetic 128 pixel by 128 pixel image of a circle. The image data may be considered incomplete owing to the lack of fine detail, as can be seen by the blocky character of the circumference. In FIG. 4(b), however, the image has been "upsampled" by using reconstruction techniques in accordance with exemplary embodiments of the present invention and a fine resolution image of 256 pixels by 256 pixels is produced. In this example, α=0.5

As discussed above, exemplary embodiments of the present invention may also be used to reconstruct MR images. In acquiring the MR image data, the frequency space of a 2D image may not be fully acquired, but it is still desired that the entire image be reconstructed. In this scenario, B represents the discrete Fourier transform matrix, and Q and b indicates the (complex) Fourier coefficients for a series of acquired lines in frequency space. Since a real-valued image reconstruction is desired additional constraints may be included, for example, as discussed below.

If the set C represents the set of Fourier coefficients acquired in frequency space, then the following equation may be solved:

$$\min_x \sigma_\alpha(Ax), \quad (19)$$
$$\text{s.t. } real(Q_C x) = real(b),$$
$$imag(Q_C x) = imag(b).$$

Accordingly, of all possible images with a Fourier transform that equal the acquired lines in frequency space, the real valued image, $x \in \Re^n$ may be solved for with the sparsest image gradients.

Figure 5:
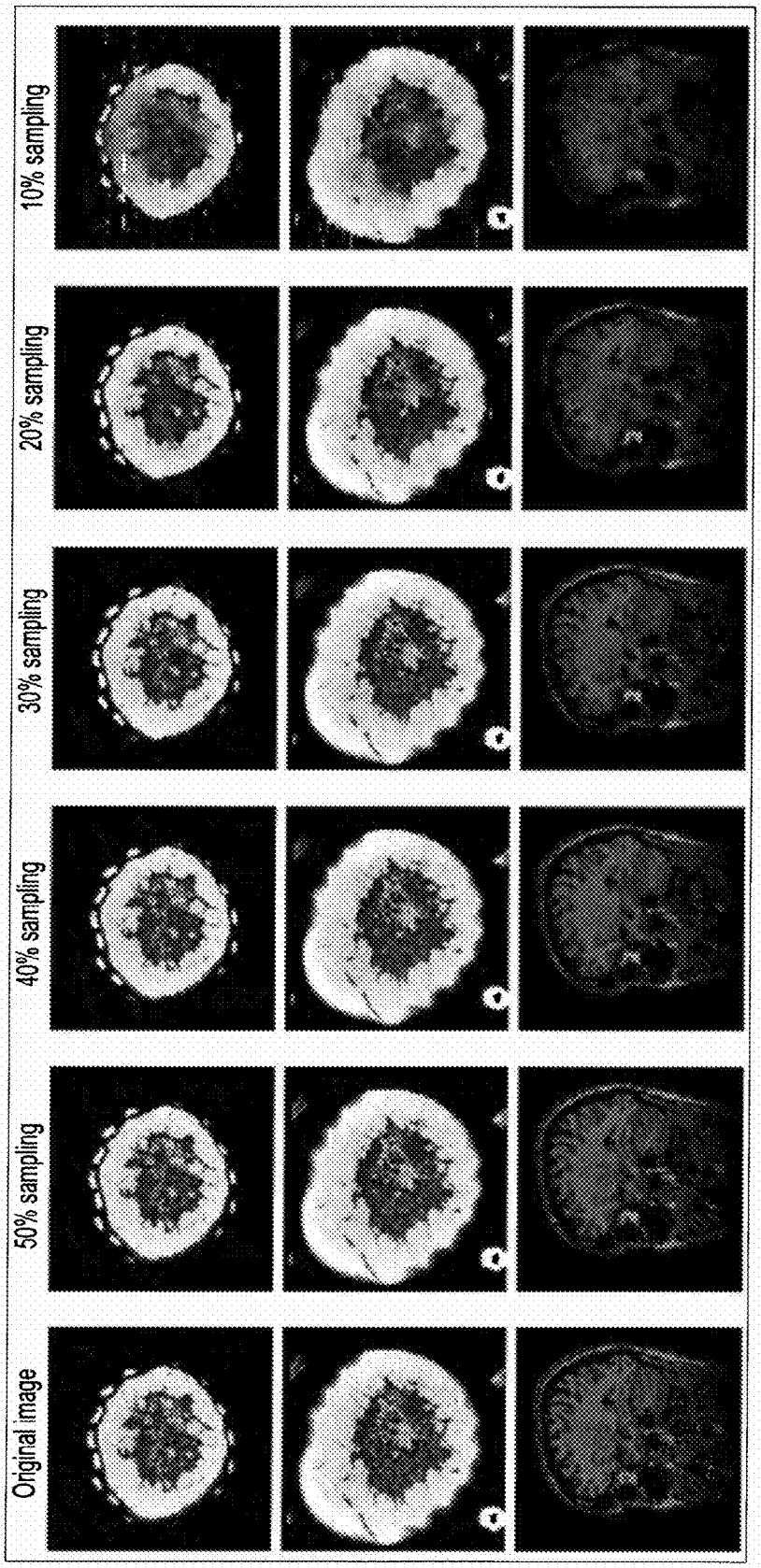
FIG. 5 shows a set of sample CT image reconstruction results according to an exemplary embodiment of the present invention.

This approach may be tested by randomly sampling lines in frequency space and then filling in the missing lines by solving Equation (19). Images may be reconstructed by sampling between 10-50% of frequency space. FIG. 5 is a set of sample CT image reconstruction results according to an exemplary embodiment of the present invention. Table 1 below shows the $l_2$ reconstruction errors for each sampling in performing this test.

TABLE 1

Summed square differences between reconstructed image and the ground truth original when assuming no acquisition noise (Algorithm 1). For all images, $\alpha = 5 \times 10^{-4}$.

| Reconstruction Error | 50% Sampling | 40% Sampling | 30% Sampling | 20% Sampling | 10% Sampling |
|---|---|---|---|---|---|
| Image 1 | $7 \times 10^{-5}$ | $9 \times 10^{-5}$ | $1.1 \times 10^{-5}$ | $1.5 \times 10^{-4}$ | $2.7 \times 10^{-4}$ |
| Image 2 | $9 \times 10^{-5}$ | $1.1 \times 10^{-4}$ | $1.3 \times 10^{-4}$ | $1.7 \times 10^{-4}$ | $2.9 \times 10^{-4}$ |
| Image 3 | $5 \times 10^{-5}$ | $7 \times 10^{-5}$ | $8 \times 10^{-5}$ | $1.5 \times 10^{-4}$ | $1.4 \times 10^{-4}$ |

The same scenario may be retested by assuming that there was some noise in the MR images, for example, using Approach 2 shown in FIG. 3. Here, the following equation is optimized:

$$\min_x \sigma_\alpha(Ax) + \lambda \sigma_\alpha(real(Q_C x - b)^{.2} + imag(Q_c x - b)^{.2}). \quad (20)$$

Figure 6:
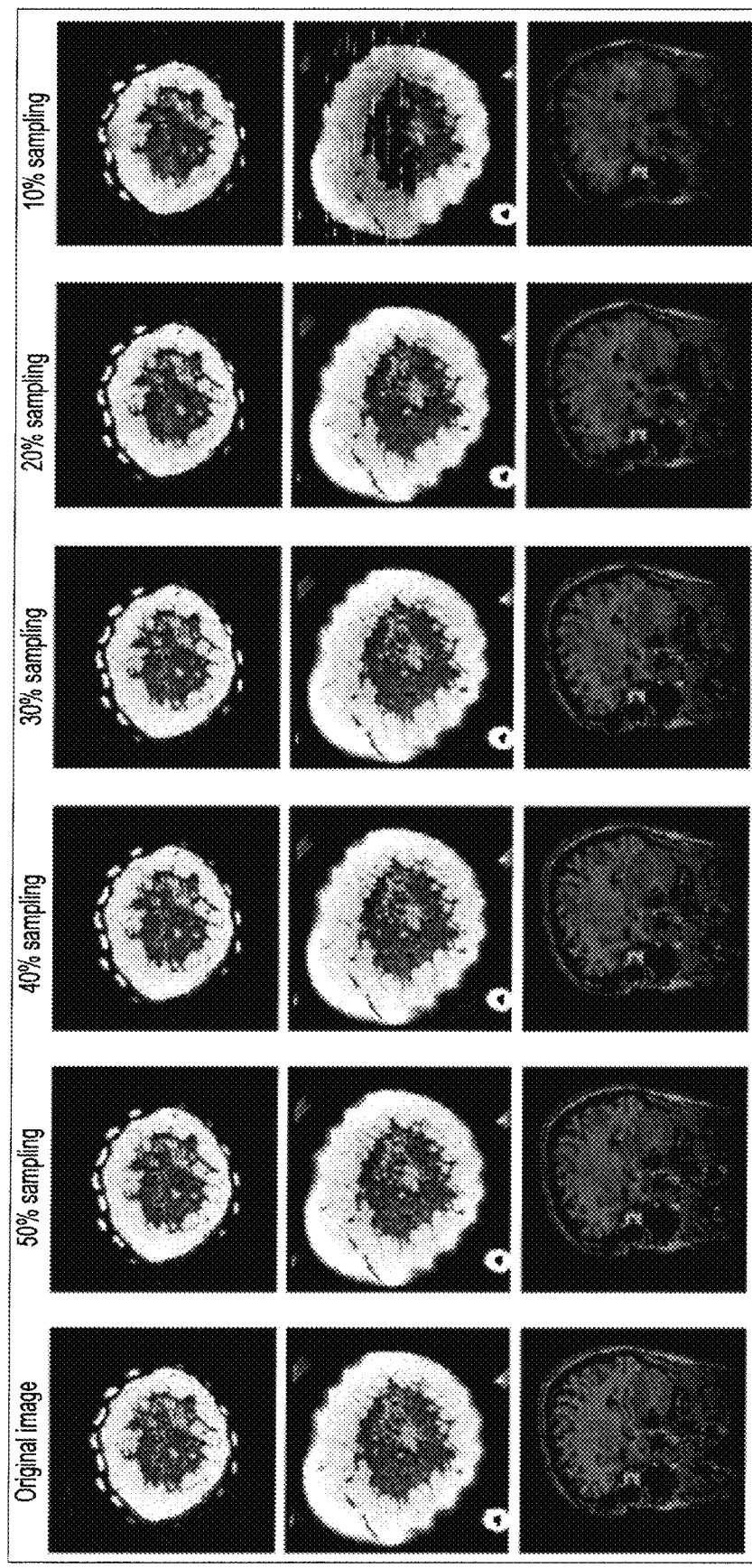
FIG. 6 is a set of sample CT image reconstruction results, assuming noise, according to an exemplary embodiment of the present invention.

Here "•²" (in MATLAB notation) represents an elementwise squaring. FIG. 6 is a set of sample CT image reconstruction results, assuming noise, according to an exemplary embodiment of the present invention. Table 2 below shows the $l_2$ reconstruction errors for each sampling in performing this test.

TABLE 2

Summed square differences between reconstructed image and the ground truth original when assuming acquisition noise (Algorithm 2). Note that the original image was normalized to lie between zero and unity.

| Reconstruction Error | 50% Sampling | 40% Sampling | 30% Sampling | 20% Sampling | 10% Sampling |
|---|---|---|---|---|---|
| Image 1 | $1.7 \times 10^{-4}$ | $1.7 \times 10^{-4}$ | $1.7 \times 10^{-4}$ | $1.8 \times 10^{-4}$ | $2.3 \times 10^{-4}$ |
| Image 2 | $1.9 \times 10^{-4}$ | $1.9 \times 10^{-4}$ | $1.9 \times 10^{-4}$ | $2.0 \times 10^{-4}$ | $4.7 \times 10^{-4}$ |
| Image 3 | $1.0 \times 10^{-4}$ | $1.0 \times 10^{-4}$ | $1.0 \times 10^{-4}$ | $1.1 \times 10^{-4}$ | $1.3 \times 10^{-4}$ |

In the disclosure above, a method for the sparse reconstruction of signals using a truncated $l_2$ norm as an approximation to the sparseness measure of an $l_0$ norm is presented. This truncated $l_2$ norm may produce a unique answer and permit a fast implementation. Specifically, such approaches may be used to reconstruct images with sparse gradients, given a limited number of samples. These samples may be taken directly from a subset of pixels in the image (e.g., super-resolution) or acquired via a set of basis functions (e.g., the Fourier basis in the MR image reconstruction setting). Other applications may include CT image reconstruction and parallel MR image reconstruction.

As discussed in detail above, exemplary embodiments of the present invention present approaches for reconstructing signals based on incomplete data quickly and accurately so that signal reconstruction may be performed effectively within an acceptable amount of time. Exemplary embodiments of the present invention provide a new approach to the approximation of sparsity that seek to minimize a number of non-very small value transform results. This approach may be calculated either assuming a noise-free signal or assuming a signal with noise, as described in detail above.

Figure 7:
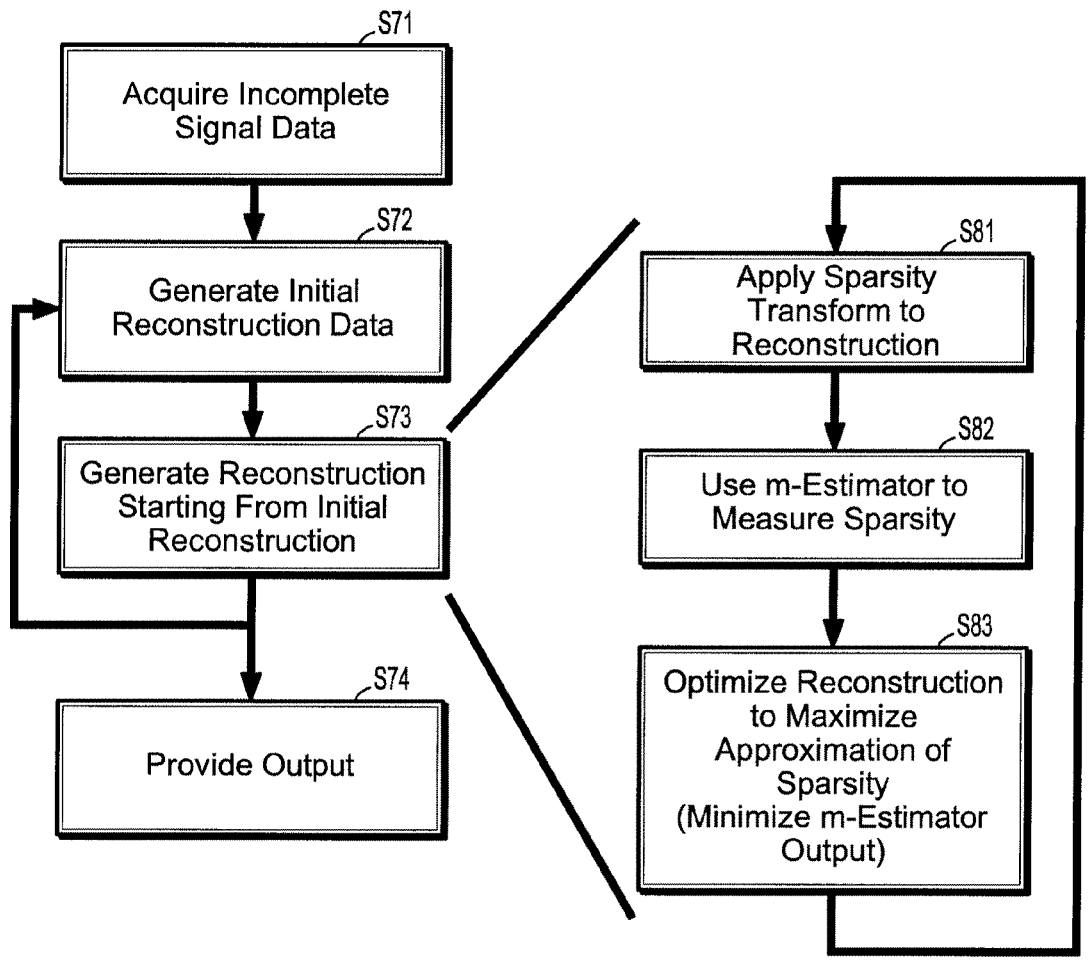
FIG. 7 is a flow chart illustrating a method for reconstructing a signal based on incomplete data according to an exemplary embodiment of the present invention.

This new approach to approximation of sparsity may utilize one of a class of m-estimator functions. FIG. 7 is a flow chart illustrating a method for reconstructing a signal based on incomplete data according to an exemplary embodiment of the present invention. First, incomplete signal data may be acquired (Step S71). As discussed above, the incomplete signal data may represent sound, imagery, or any other form of signal. The signal data may be incomplete as a result of insufficient sampling, incomplete reception, compression and/or for any other reason. For example, the incomplete signal data may be CT data acquired from a CT scanner.

An initial reconstruction may then be generated for the acquired incomplete signal data (Step S72). While various techniques may be utilized for generating the initial reconstruction, one exemplary approach involves assuming that all unknown data can be represented by a predetermined value, for example, zero. By setting all unknown data to zero, a rough-reconstruction may be generated. This rough-reconstruction may then be used as a starting position from which exemplary embodiments of the present invention may use to optimize a reconstruction.

Thus the actual reconstruction may be generated by starting from the initial reconstruction (Step S73). This may be an iterative process in which the reconstruction is improved and then the improved reconstruction is used as a starting position for a subsequent improving iteration. This iterative process may proceed until subsequent iterations no longer produce noticeable changes in the reconstruction. The iterative generation of the actual reconstruction from the initial reconstruction may include the following steps:

A sparsity transform may be performed on the reconstruction (Step S81). During the first iteration, the sparsity transform is applied to the initial reconstruction, but thereafter, subsequent iterations will apply the sparsity transform to the reconstruction of the immediately prior iteration. The sparsity transform used may be a gradient transform. In such a case, the sparsity transform is used to calculate the gradient of the reconstruction. Alternatively, other transforms may also be used in place of or in addition to the gradient transform. For example, the sparsity transform may be a wavelet transform.

Next the calculated sparsity transform, for example, the gradients of the reconstruction, may be used in an m-estimator function, for example, a differentiable m-estimator, to measure an approximation of sparsity for the current reconstruction (Step S82). As discussed above, any m-estimator may be used, for example, the Welsch function, the Cauchy function, the Turkey function, the Huber function, the Fair function, and/or the German function. Sparse reconstruction, in general, involves finding a reconstruction that maximizes true sparsity (or the presence of zero values) of the reconstruction gradients. However, here, as sparsity is approximated by measuring the presence of very small values, and the degree to which sparsity has been achieved is measured with the use of an m-estimator, the reconstruction may then be optimized such that in the next iteration, the approximation of sparsity is more accurate than it was in the prior iteration and/or so that approximation of sparsity is minimized such that there are more reconstruction gradients that are very close to zero (Step S83).

Very small values may be values that are nearly zero. The analysis discussed above provides greater detail as to how very small values contribute to the approximation of sparsity.

Optimization may be performed distinctly for the case in which it is assumed that the reconstruction does not include noise and the case in which it is assumed that the reconstruction does include noise. When it is assumed that the reconstruction includes noise, noise may be penalized as discussed in detail above.

As optimization may include the minimizing of the approximation of sparsity, this minimization may be performed, for example, using a series of quadratic minimization problems. When it is assumed that the incomplete signal data includes noise, a strict equality constraint may be relaxed and deviations from measurements with an $l_2$ measure may be penalized.

After optimization is complete, the actual approximation of sparsity may be incrementally updated to determine a more accurate approximation for sparsity. The new approximation of sparsity may then be used and initial reconstruction data may be generated again (Step S72). However, here, the previous output reconstruction may be used as the initial reconstruction. Such refinement of the approximation may continue until subsequent iterations no longer produce measurable refinement.

After optimization is complete, the resulting reconstruction may be used to generate desired output (Step S74). For example, where the incomplete signal data is incomplete image data, the optimized reconstruction may be used to provide a super-resolution image.

Figure 8:
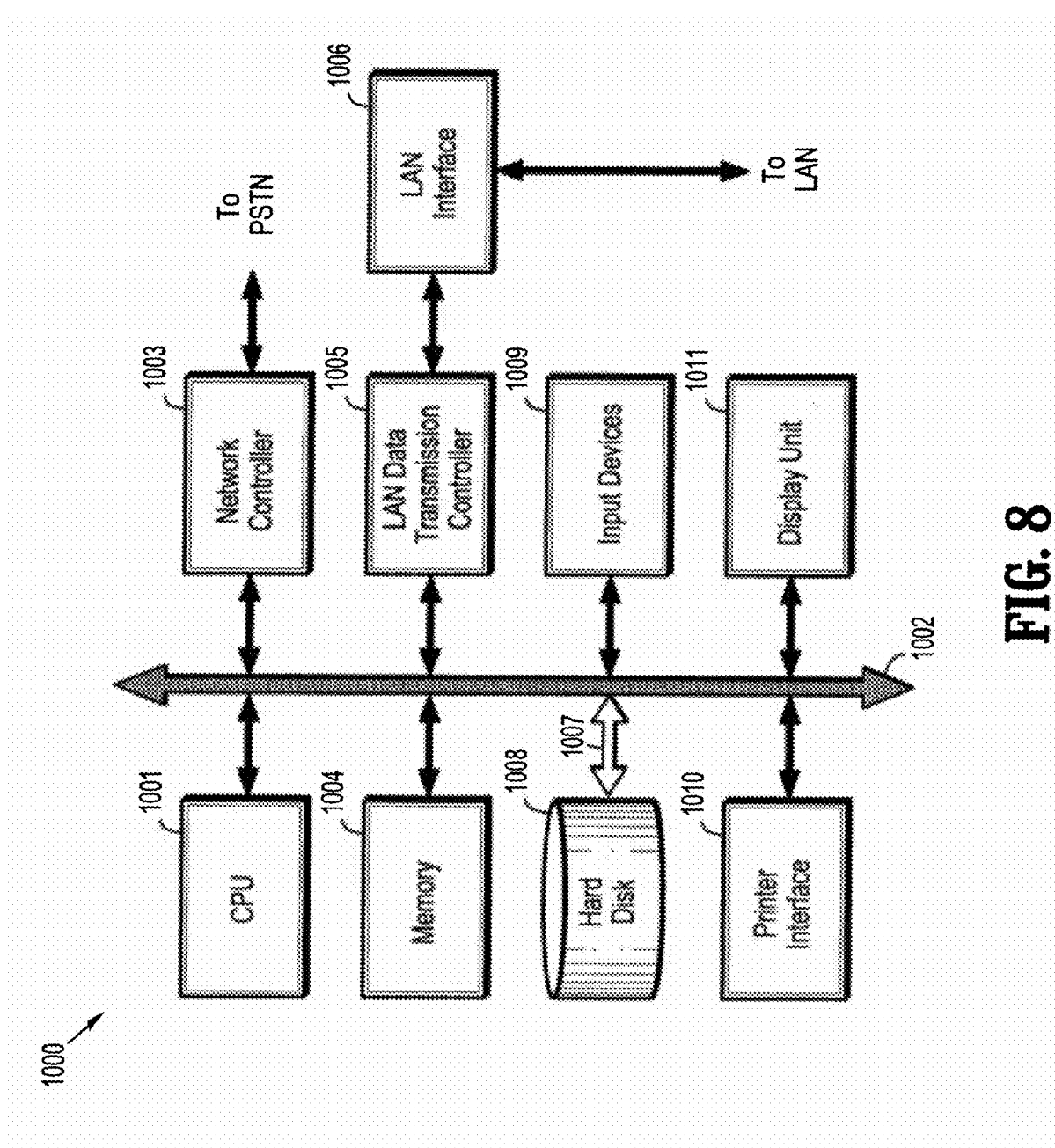
FIG. 8 shows an example of a computer system capable of implementing the method and apparatus according to embodiments of the present disclosure.

FIG. 8 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for reconstructing a signal from incomplete data, comprising:
   acquiring incomplete signal data;
   generating an initial reconstruction of the incomplete signal data;
   generating a reconstruction starting from the initial reconstruction by repeating the steps of:
   calculating a sparsity transform of the reconstruction;
   measuring an approximation of sparsity of the reconstruction by applying an m-estimator to the calculated sparsity transform;
   iteratively optimizing the reconstruction to minimize output of the m-estimator and thereby maximizing the approximation of sparsity for the reconstruction; and
   providing the optimized reconstruction as a representation of the incomplete data,
   wherein each of the above steps is performed by a signal processing device.

2. The method of claim 1, wherein the sparsity transform is a gradient transform.

3. The method of claim 1, wherein the sparsity transform is a wavelet transform.

4. The method of claim 1, wherein the incomplete signal data is acoustic data.

5. The method of claim 1, wherein the incomplete signal data is image data.

6. The method of claim 1, wherein the image data is MR (Magnetic Resonance) data.

7. The method of claim 1, wherein the m-estimator is one or more of a Welsch function, a Cauchy function, a Tukey function, a Huber function, a Fair function, or a Geman function.

8. The method of claim 1, wherein the approximation of sparsity is measured using a robust error function $\sigma_\alpha(x)$ that is defined as:

$$\sigma_\alpha(x) = \sum_i \left(1 - e^{-\alpha x_i^2}\right)$$

wherein $\alpha$ determines the degree to which sparsity is approximated.

9. The method of claim 8, wherein minimizing the output of the m-estimator is performed by optimizing:

$$\min_x \sigma_\alpha(Ax),$$

s.t. $Bx = b$ wherein A is the sparsity transform, B is a matrix representing the acquisition basis of the acquired incomplete signal data, b is a vector of measurement for the acquired incomplete signal data, and x is the reconstruction.

10. The method of claim 1, wherein minimizing the output of the m-estimator includes minimizing the occurrence of outputs of the sparsity transforms that are not very small, wherein what is defined to be very small is determined by $\alpha$, which is the degree to which sparsity is approximated.

11. The method of claim 1, wherein minimizing the output of the m-estimator includes minimizing a robust error function $\sigma_\alpha(x)$ that is defined by the m-estimator.

12. The method of claim 1, wherein minimizing the output of the m-estimator is performed using a series of quadratic minimization problems.

13. The method of claim 1, wherein the incomplete signal data is assumed to be either noiseless or to include noise and when it is assumed that the incomplete signal data includes noise, noise is penalized during the generation of the initial reconstruction.

14. The method of claim 13, wherein noise is penalized during the generation of the initial reconstruction includes relaxing a strict equality constraint and penalizing deviations from measurements with an $l_2$ measure.

15. The method of claim 13, wherein noise is penalized during the generation of the initial reconstruction by penalizing deviations from measurements with an $l_0$ measure that measures error as a number of acquired measurements that are not satisfied by the initial reconstruction.

16. The method of claim 1, wherein the initial reconstruction is generated by assuming data missing from the incomplete data has a particular value.

17. The method of claim 1, wherein the initial reconstruction is generated using a known approach for finding an optimized reconstruction or by using, as the initial reconstruction, an optimized reconstruction of a prior performance of the steps of calculating the sparsity transform, measuring an approximation of sparsity of the reconstruction, and iteratively optimizing the reconstruction.

18. The method of claim 17, wherein in the steps of measuring an approximation of sparsity of the reconstruction and iteratively optimizing the reconstruction, sparsity is approximated to a different degree than when these steps are performed during the prior performance.

19. The method of claim 1, wherein providing the optimized reconstruction as a representation of the incomplete data includes displaying the reconstruction to a user.

20. A signal processing system for reconstructing a signal from incomplete data, comprising:
   an initial reconstruction unit for generating an initial reconstruction of incomplete signal data; and
   an optimizing unit for generating a reconstruction starting with the initial reconstruction by iteratively optimizing the reconstruction to maximize an approximation of sparsity for the reconstruction,
   wherein the approximation of sparsity for the reconstruction includes the use of an m-estimator, and wherein the initial reconstruction unit and the optimization unit include one or more computer processors.

21. The system of claim 20, wherein the approximation of sparsity for the reconstruction includes the use of an m-estimator applied to a calculation of a sparsity transform of the reconstruction.

22. A computer system comprising:
a processor; and
a program storage device readable by the computer system, embodying a program of instructions executable by the processor to perform method steps for reconstructing a signal from incomplete data, the method comprising:

generating an initial reconstruction of an incomplete signal data; and
generating a reconstruction starting from the initial reconstruction by repeating the steps of:
calculating a sparsity transform of the reconstruction;
measuring an approximation of sparsity of the reconstruction by applying an m-estimator to the calculated sparsity transform; and
iteratively optimizing the reconstruction to maximize the approximation of sparsity for the reconstruction.

* * * * *